United States Patent Office 3,309,815
Patented Mar. 21, 1967

3,309,815
CULTIVATION OF HOP PLANTS
Yasuo Umeda, Yokohama-shi, Shigeo Sasaki, Kofu-shi, Shinkichi Kubo, Nirasaki-shi, and Hiroshi Kitami and Toru Sasahara, Yokohama-shi, Japan, assignors to Kirin Beer Kabushiki Kaisha, Chuo-ku, Japan, a joint-stock company of Japan
No Drawing. Filed May 26, 1965, Ser. No. 459,117
2 Claims. (Cl. 47—58)

This invention relates to the cultivates of hop plants (*Humulus lupulus* L.), and more particularly it relates to a method in which female hop plants are exposed to artificial light rays at night during a suitable period of their growth, thereby to accelerate the growth of their stems and leaves, to increase the number of female flowers, the yield of the cones, as well as the contents of resins and other components, thus to improve the quality of the said plants.

The hop plant is dioecious. Only the female flowers of this plant are used in brewing as raw material. The said female flowers bloom during the period of June through July and are gathered during the period of August through September.

The resins (humulones, lupulones and others) contained in the lupulin glands of the said female flowers give beer its characteristic bitterness in particular, the humulones are changed into iso-compounds soluble in beer on boiling of wort with hops, thus fulfilling an essential function among the components of bitterness.

According to the present invention there is provided a method which is based on cultivating female hop plants under the exposure to artificial light rays from 0.2 to 50 luxes continuously or intermittently at night during a suitable period of their growth.

In the embodiment of this invention, female plants of *Humulus lupulus* L. are wholly exposed to artificial light rays (infra-red, fluorescent, or incandescent light) of over 0.2 lux continuously or intermittently at night from sunset to sunrise for about 40 days during a suitable period of their growth, that is, when the said plants have reached a height of approximately 2 meters, thereby to accelerate the growth of their stems and leaves and to increase the number of female flowers, thus increasing the yield of the cones as well as the contents of resins, particularly of humulones.

In the application of the said artificial light rays, the time of beginning of irradiation, the duration of irradiation, and the quantity of light (intensity of illumination at 5.5 m. above the wire trellis) influence greatly the growth of the cones of the plant.

In the following, the embodiments of this invention will be explained in detail in connection with experiments on artificial light ray projection at a hop garden.

Experiment 1

Various artificial light ray lamps (ultraviolet, infrared, fluorescent, incandescent light) were fixed 1.8 meters above the wire trellis of the hop plants, which were illuminated continuously from sunset to sunrise during the period of 22nd May to 7th July. Intensities of the illumination are given in Table I.

In this table, there are presented the yield of cones per 10 ares, which are calculated from the data of the typical plants in each experiment, and the content of resins.

TABLE I

| Source of Illumination | Watt | Duration of Illumination | Intensity of Illumination (lux) | Yield per 10 ares, kg. (dry cones)[1] | Resin content, percent (on dry basis) | |
|---|---|---|---|---|---|---|
| | | | | | Total resin | Humulones |
| Reference | | | | 110 | 17.4 | 5.4 |
| Ultraviolet | 15 | 22d May–5th July | 5–9 | 14 | | |
| Infrared | 100 | ----do---- | 80–100 | 195 | 19.3 | 6.8 |
| Luminescent | 20 | ----do---- | 80–120 | 219 | 19.9 | 7.1 |
| Incandescent: | | | | | | |
| 1 | 20 | ----do---- | 8–10 | 121 | 19.4 | 7.0 |
| 2 | 20 | ----do---- | 8–10 | 213 | 18.5 | 6.3 |
| 3 | 20 | 10th June–7th July | 8–10 | 171 | 19.5 | 6.7 |

[1] Yields per 10 ares are estimated from that of a typical plant (the same applying hereinafter).

As clearly seen from the above table, the yield per 10 ares and the content of resins under the infrared, fluorescent and incandescent 1, 2 3 light sources exceed those of the reference, excepting those of ultraviolet.

Experiment 2

An incandescent lamp of 150 w. was fixed 1.8 meter above the wire-trellis of the hop plants, which were illuminated by said lamp continuously at night during the period from 25th May to 26th June when the plants had attained about two meters in height. In the following Table II, there are shown the number of flowers, yield per 10 ares and resin content of sample plants corresponding to the respective illumination.

TABLE II

| Sample plants | Intensity of illumination (lux) | Number of flowers per plant | Yield per 10 ares, kg. (dry cones) | Resin content, percent | |
|---|---|---|---|---|---|
| | | | | Total resin | Humolones |
| 1 | 12.0 | 4,460 | 99 | 21.1 | 6.8 |
| 2 | 9.2 | 5,330 | 168 | 19.0 | 6.1 |
| 3 | 5.7 | 9,530 | 243 | 20.0 | 6.3 |
| 4 | 2.4 | 11,620 | 345 | 19.2 | 6.1 |
| 5 | 1.2 | 6,720 | 232 | 17.4 | 4.7 |
| 6 | 0.6 | 8,740 | 299 | 16.5 | 5.7 |
| 7 | 0.3 | 3,580 | 147 | 15.2 | 4.8 |
| 8 | Reference | 1,680 | 68 | 15.1 | 3.3 |

As seen from this table, the number of flowers, yield per 10 ares and resin content are increased even with an illumination of 0.3 lux.

From the above results, as for the beginning time of illumination, it is concluded that significant effect of illumination cannot be expected to increase the yield when a certain stage of growth has passed. It is necessary to choose a suitable stage, and said suitable stage corresponds to about the 20th of May when the hop plants have attained about 2 meters in height.

Concerning the luminous intensity, which may be indicated by the intensity of illumination, this may be increased over 0.2 lux as much as one wishes if the appearance of the cones as a commodity is not taken into account. However, it is noted that when the plants are exposed to strong illumination, the plants produce cones which appear as immature cones of normally cultivated plants. Therefore, for obtaining mature cones, it is necessary to use reduced illumination, that is, from 0.2 to 50 luxes.

Furthermore, concerning the duration of illumination, when illuminated up to the harvest time (August through September), the plants produce unfavourably immature cones. Practically, a duration from 20 days to 40 days is most effective.

When the above considerations are compiled, it is apparent that an increase in the number of hop cones and in the resin content can be expected by irradiation with artificial light of suitable illumination (from 0.2 lux to 50 luxes) continuously or intermittently from sunset to sunrise at night for 20 to 40 days starting from a suitable time (when the plants have attained about 2 meters in height).

In order to indicate more fully the nature of the invention, the following typical example of procedure according to the invention is presented.

The cultivation of the hop plants is carried out in the ordinary manner. Wire work, fertilization, ploughing, stringing, pruning, and sterilization are also carried out in the conventional manner. An incandescent lamp of 100 w. is fixed 1.8 meters above the wire-trellis, the said lamp being lit from sunset to sunrise from the time when the plants have attained about 2 meters in height. The illumination is continued for 35 days and then terminated. Thereafter, the normal cultivation procedure is continued until the harvest time, and at that time cones matured completely are harvested.

From the above experiments and embodiment of the invention, it was ascertained that it is possible to increase the yield of cones per acre and also the content of resins contained therein by projecting onto the plants a suitable quantity of artificial light rays for a suitable period starting from a suitable stage of growth of the plants.

What we claim is:
1. In the cultivation of female hop plants (*Humulus lupulus* L.), a method for increasing the yield of female flowers and improving the quality of hops obtainable therefrom, which method comprises irradiating the said plants with artificial light of an illuminance of from 0.2 to 50 luxes as measured at the wire-trellises supporting the plants, the plants being so irradiated continuously from sunset to sunrise each night during a period of from 20 to 40 days starting from the time when the plants have attained a height of approximately 2 meters.

2. In the cultivation of female hop plants (*Humulus lupulus* L.), a method for increasing the yield of female flowers and improving the quality of hops obtainable therefrom, which method comprises irradiating said plants with artificial light of an illuminance of from 0.2 to 50 luxes as measured at the wire-trellises supporting the plants, the plants being so irradiated intermittently from sunset to sunrise each night during a period of from 20 to 40 days starting from the time when the plants have attained a height of approximately 2 meters.

No references cited.

ABRAHAM G. STONE, *Primary Examiner.*

R. E. BAGWILL, *Assistant Examiner.*